(12) United States Patent
Rodriguez et al.

(10) Patent No.: US 8,457,346 B2
(45) Date of Patent: Jun. 4, 2013

(54) DIGITAL WATERMARKING IMAGE SIGNALS ON-CHIP

(75) Inventors: Tony F. Rodriguez, Portland, OR (US); Trent J. Brundage, Tigard, OR (US)

(73) Assignee: Digimarc Corporation, Beaverton, OR (US)

( * ) Notice: Subject to any disclaimer, the term of this patent is extended or adjusted under 35 U.S.C. 154(b) by 2172 days.

(21) Appl. No.: 11/051,502

(22) Filed: Feb. 3, 2005

(65) Prior Publication Data

US 2005/0169499 A1 Aug. 4, 2005

Related U.S. Application Data

(63) Continuation-in-part of application No. 09/842,282, filed on Apr. 24, 2001, now Pat. No. 7,024,016.

(60) Provisional application No. 60/542,095, filed on Feb. 4, 2004, provisional application No. 60/600,618, filed on Aug. 9, 2004.

(51) Int. Cl.
*G06K 9/00* (2006.01)

(52) U.S. Cl.
USPC ............................................................ 382/100

(58) Field of Classification Search
USPC ............................................................ 382/100
See application file for complete search history.

(56) References Cited

U.S. PATENT DOCUMENTS

| | | |
|---|---|---|
| 3,971,065 A | 7/1976 | Bayer |
| 4,403,869 A | 9/1983 | Crutcher |
| 4,511,259 A | 4/1985 | Horiuchi |
| 4,590,366 A | 5/1986 | Rothfjell |
| 4,807,031 A | 2/1989 | Broughton et al. |
| 4,920,428 A | 4/1990 | Lin et al. |
| 5,010,405 A | 4/1991 | Schreiber et al. |
| 5,135,095 A | 8/1992 | Kocznar et al. |
| 5,471,515 A | 11/1995 | Fossum et al. |
| 5,499,294 A | 3/1996 | Friedman |
| 5,617,119 A | 4/1997 | Briggs et al. |
| 5,663,766 A | 9/1997 | Sizer, II |
| 5,671,267 A | 9/1997 | August et al. |
| 5,708,263 A | 1/1998 | Wong |
| 5,764,770 A | 6/1998 | Schipper et al. |
| 5,772,250 A | 6/1998 | Gasper |
| 5,835,141 A | 11/1998 | Ackland et al. |
| 5,862,260 A | 1/1999 | Rhoads |
| 6,001,540 A | 12/1999 | Huang et al. |
| 6,021,172 A | 2/2000 | Fossum et al. |

(Continued)

FOREIGN PATENT DOCUMENTS

| | | |
|---|---|---|
| JP | 2001-203874 | 7/2001 |
| JP | 2004-296705 | 10/2004 |
| WO | WO2005/076985 | 8/2005 |

OTHER PUBLICATIONS

U.S. Appl. No. 60/542,095, filed Feb. 4, 2004, Rodriguez et al.

(Continued)

*Primary Examiner* — Edward Park

(57) ABSTRACT

The disclosure describes methods and apparatus for providing digital watermarks or steganographic indicia in image or video data. One implementation embeds digital watermarks on-chip with respect to a CMOS or CCD image array. Some implementations introduce a watermark component during image capture, the watermark being introduced through variations in physical characteristics of a set of pixels. Other implementations are provided and claimed as well.

1 Claim, 7 Drawing Sheets

U.S. PATENT DOCUMENTS

| | | | |
|---|---|---|---|
| 6,061,793 A * | 5/2000 | Tewfik et al. | 713/176 |
| 6,097,361 A | 8/2000 | Rohner | |
| 6,119,944 A | 9/2000 | Mulla et al. | |
| 6,122,403 A | 9/2000 | Rhoads | |
| 6,130,741 A | 10/2000 | Wen et al. | |
| 6,192,138 B1 * | 2/2001 | Yamadaji | 382/100 |
| 6,215,421 B1 | 4/2001 | Kondo et al. | |
| 6,229,924 B1 | 5/2001 | Rhoads et al. | |
| 6,249,588 B1 | 6/2001 | Amidror et al. | |
| 6,282,362 B1 | 8/2001 | Murphy et al. | |
| 6,307,949 B1 | 10/2001 | Rhoads | |
| 6,311,214 B1 | 10/2001 | Rhoads | |
| 6,359,837 B1 | 3/2002 | Tsukamoto | |
| 6,381,341 B1 | 4/2002 | Rhoads | |
| 6,385,329 B1 * | 5/2002 | Sharma et al. | 382/100 |
| 6,396,539 B1 | 5/2002 | Heller | |
| 6,396,594 B1 | 5/2002 | French et al. | |
| 6,408,082 B1 | 6/2002 | Rhoads et al. | |
| 6,421,070 B1 | 7/2002 | Ramos et al. | |
| 6,424,725 B1 | 7/2002 | Rhoads et al. | |
| 6,501,397 B1 | 12/2002 | Radha et al. | |
| 6,516,079 B1 | 2/2003 | Rhoads et al. | |
| 6,522,770 B1 | 2/2003 | Seder et al. | |
| 6,531,266 B1 | 3/2003 | Chang et al. | |
| 6,535,617 B1 | 3/2003 | Hannigan et al. | |
| 6,535,629 B2 | 3/2003 | McCormick et al. | |
| 6,542,927 B2 | 4/2003 | Rhoads | |
| 6,549,638 B2 | 4/2003 | Davis et al. | |
| 6,553,129 B1 | 4/2003 | Rhoads | |
| 6,567,533 B1 | 5/2003 | Rhoads | |
| 6,573,916 B1 | 6/2003 | Grossweiler, III et al. | |
| 6,580,804 B1 | 6/2003 | Abe | |
| 6,580,808 B2 | 6/2003 | Rhoads | |
| 6,590,996 B1 | 7/2003 | Reed et al. | |
| 6,611,607 B1 | 8/2003 | Davis et al. | |
| 6,614,914 B1 | 9/2003 | Rhoads et al. | |
| 6,639,261 B2 | 10/2003 | Rhodes | |
| 6,643,386 B1 * | 11/2003 | Foster | 382/100 |
| 6,645,788 B2 | 11/2003 | Rhodes et al. | |
| 6,647,128 B1 | 11/2003 | Rhoads | |
| 6,647,130 B2 | 11/2003 | Rhoads | |
| 6,650,761 B1 | 11/2003 | Rodriguez et al. | |
| 6,654,057 B1 | 11/2003 | Rhodes | |
| 6,656,760 B2 | 12/2003 | Schmitz et al. | |
| 6,665,009 B1 | 12/2003 | Dong | |
| 6,674,876 B1 | 1/2004 | Hannigan et al. | |
| 6,680,748 B1 | 1/2004 | Monti | |
| 6,681,028 B2 | 1/2004 | Rodriguez et al. | |
| 6,681,029 B1 | 1/2004 | Rhoads | |
| 6,694,042 B2 | 2/2004 | Seder et al. | |
| 6,694,043 B2 | 2/2004 | Seder et al. | |
| 6,700,990 B1 | 3/2004 | Rhoads | |
| 6,700,995 B2 | 3/2004 | Reed | |
| 6,704,869 B2 | 3/2004 | Rhoads et al. | |
| 6,707,493 B1 | 3/2004 | Lee et al. | |
| 6,718,046 B2 | 4/2004 | Reed et al. | |
| 6,718,047 B2 | 4/2004 | Rhoads | |
| 6,721,440 B2 | 4/2004 | Reed et al. | |
| 6,760,463 B2 | 7/2004 | Rhoads | |
| 6,763,123 B2 | 7/2004 | Reed et al. | |
| 6,768,809 B2 | 7/2004 | Rhoads et al. | |
| 6,773,953 B1 * | 8/2004 | Gaylord | 438/57 |
| 6,775,392 B1 | 8/2004 | Rhoads | |
| 6,786,397 B2 | 9/2004 | Silverbrook et al. | |
| 6,798,894 B2 | 9/2004 | Rhoads | |
| 6,813,366 B1 | 11/2004 | Rhoads | |
| 6,818,276 B2 | 11/2004 | Bourdelais et al. | |
| 6,879,701 B1 | 4/2005 | Rhoads | |
| 6,894,794 B1 | 5/2005 | Patton et al. | |
| 6,901,236 B2 | 5/2005 | Saitoh et al. | |
| 6,916,680 B2 | 7/2005 | Lee et al. | |
| 6,917,724 B2 | 7/2005 | Seder et al. | |
| 6,920,232 B2 | 7/2005 | Rhoads | |
| 6,947,571 B1 | 9/2005 | Rhoads et al. | |
| 6,968,072 B1 * | 11/2005 | Tian | 382/100 |
| 6,968,455 B2 | 11/2005 | Okayasu et al. | |
| 6,975,746 B2 | 12/2005 | Davis et al. | |
| 6,988,202 B1 | 1/2006 | Rhoads et al. | |
| 6,996,252 B2 | 2/2006 | Reed et al. | |
| 7,003,731 B1 | 2/2006 | Rhoads et al. | |
| 7,007,243 B2 * | 2/2006 | Baldino | 715/853 |
| 7,023,031 B2 | 4/2006 | Tsai | |
| 7,024,016 B2 * | 4/2006 | Rhoads et al. | 382/100 |
| 7,027,614 B2 | 4/2006 | Reed | |
| 7,035,427 B2 | 4/2006 | Rhoads | |
| 7,044,395 B1 | 5/2006 | Davis et al. | |
| 7,051,086 B2 | 5/2006 | Rhoads et al. | |
| 7,053,908 B2 | 5/2006 | Saquib et al. | |
| 7,054,465 B2 | 5/2006 | Rhoads | |
| 7,062,069 B2 | 6/2006 | Rhoads | |
| 7,095,871 B2 | 8/2006 | Jones et al. | |
| 7,106,371 B1 | 9/2006 | Kubo et al. | |
| 7,111,170 B2 | 9/2006 | Rhoads et al. | |
| 7,113,614 B2 | 9/2006 | Rhoads | |
| 7,139,408 B2 | 11/2006 | Rhoads et al. | |
| 7,158,654 B2 | 1/2007 | Rhoads | |
| 7,164,780 B2 | 1/2007 | Brundage et al. | |
| 7,171,016 B1 | 1/2007 | Rhoads | |
| 7,174,031 B2 | 2/2007 | Rhoads et al. | |
| 7,177,443 B2 | 2/2007 | Rhoads | |
| 7,213,757 B2 | 5/2007 | Jones et al. | |
| 7,224,819 B2 | 5/2007 | Levy et al. | |
| 7,248,717 B2 | 7/2007 | Rhoads | |
| 7,261,612 B1 | 8/2007 | Hannigan et al. | |
| 7,305,104 B2 | 12/2007 | Carr et al. | |
| 7,308,110 B2 | 12/2007 | Rhoads | |
| 7,313,251 B2 | 12/2007 | Rhoads | |
| 7,319,775 B2 | 1/2008 | Sharma et al. | |
| 7,330,564 B2 | 2/2008 | Brundage et al. | |
| 7,369,678 B2 | 5/2008 | Rhoads | |
| 7,377,421 B2 | 5/2008 | Rhoads | |
| 7,391,880 B2 | 6/2008 | Reed et al. | |
| 7,406,214 B2 | 7/2008 | Rhoads et al. | |
| 7,424,131 B2 | 9/2008 | Alattar et al. | |
| 7,427,030 B2 | 9/2008 | Jones et al. | |
| 7,433,491 B2 | 10/2008 | Rhoads | |
| 7,444,000 B2 | 10/2008 | Rhoads | |
| 7,444,392 B2 | 10/2008 | Rhoads et al. | |
| 7,450,734 B2 | 11/2008 | Rodriguez et al. | |
| 7,460,726 B2 | 12/2008 | Levy et al. | |
| 7,466,840 B2 | 12/2008 | Rhoads | |
| 7,486,799 B2 | 2/2009 | Rhoads | |
| 7,502,759 B2 | 3/2009 | Hannigan et al. | |
| 7,508,955 B2 | 3/2009 | Carr et al. | |
| 7,515,733 B2 | 4/2009 | Rhoads | |
| 7,536,034 B2 | 5/2009 | Rhoads et al. | |
| 7,537,170 B2 | 5/2009 | Reed et al. | |
| 7,545,952 B2 | 6/2009 | Brundage et al. | |
| 7,564,992 B2 | 7/2009 | Rhoads | |
| RE40,919 E | 9/2009 | Rhoads | |
| 7,602,978 B2 | 10/2009 | Levy et al. | |
| 7,628,320 B2 | 12/2009 | Rhoads | |
| 7,643,649 B2 | 1/2010 | Davis et al. | |
| 7,650,009 B2 | 1/2010 | Rhoads | |
| 7,653,210 B2 | 1/2010 | Rhoads | |
| 7,657,058 B2 | 2/2010 | Sharma | |
| 7,685,426 B2 | 3/2010 | Ramos et al. | |
| 7,693,300 B2 | 4/2010 | Reed et al. | |
| 7,697,719 B2 | 4/2010 | Rhoads | |
| 7,711,143 B2 | 5/2010 | Rhoads | |
| 7,738,673 B2 | 6/2010 | Reed | |
| 7,747,038 B2 | 6/2010 | Rhoads | |
| 7,751,588 B2 | 7/2010 | Rhoads | |
| 7,751,596 B2 | 7/2010 | Rhoads | |
| 7,756,290 B2 | 7/2010 | Rhoads | |
| 7,760,905 B2 | 7/2010 | Rhoads et al. | |
| 7,762,468 B2 | 7/2010 | Reed et al. | |
| 7,787,653 B2 | 8/2010 | Rhoads | |
| 7,792,325 B2 | 9/2010 | Rhoads et al. | |
| 7,822,225 B2 | 10/2010 | Alattar | |
| 7,837,094 B2 | 11/2010 | Rhoads | |
| 7,945,781 B1 | 5/2011 | Rhoads | |
| 7,949,147 B2 | 5/2011 | Rhoads et al. | |
| 7,953,270 B2 | 5/2011 | Rhoads | |
| 7,953,824 B2 | 5/2011 | Rhoads et al. | |
| 7,957,553 B2 | 6/2011 | Ellingson et al. | |
| 7,961,949 B2 | 6/2011 | Levy et al. | |

| | | |
|---|---|---|
| 7,970,166 B2 | 6/2011 | Carr et al. |
| 7,970,167 B2 | 6/2011 | Rhoads |
| 2001/0011233 A1 | 8/2001 | Narayanaswami |
| 2001/0026377 A1 | 10/2001 | Ikegami |
| 2001/0034705 A1 | 10/2001 | Rhoads et al. |
| 2001/0051915 A1 | 12/2001 | Ueno et al. |
| 2001/0055407 A1 | 12/2001 | Rhoads |
| 2002/0006212 A1 | 1/2002 | Rhoads et al. |
| 2002/0009208 A1 | 1/2002 | Alattar et al. |
| 2002/0018879 A1 | 2/2002 | Barnhart et al. |
| 2002/0031241 A1 | 3/2002 | Kawaguachi et al. |
| 2002/0078357 A1 | 6/2002 | Bruekers et al. |
| 2002/0080271 A1 | 6/2002 | Eveleens et al. |
| 2002/0080396 A1 | 6/2002 | Silverbrook et al. |
| 2002/0106102 A1 | 8/2002 | Au et al. |
| 2002/0118394 A1 | 8/2002 | McKinley et al. |
| 2002/0120849 A1 | 8/2002 | McKinley et al. |
| 2002/0131076 A1 | 9/2002 | Davis |
| 2002/0153661 A1 | 10/2002 | Brooks et al. |
| 2002/0176003 A1 | 11/2002 | Seder et al. |
| 2002/0186886 A1 | 12/2002 | Rhoads |
| 2002/0191810 A1 | 12/2002 | Fudge et al. |
| 2002/0196272 A1 | 12/2002 | Ramos et al. |
| 2003/0025805 A1 | 2/2003 | Yamagishi |
| 2003/0040957 A1 | 2/2003 | Rhoads et al. |
| 2003/0081809 A1 | 5/2003 | Fridrich et al. |
| 2003/0105730 A1 | 6/2003 | Davis et al. |
| 2003/0130954 A1 | 7/2003 | Carr et al. |
| 2004/0005093 A1 | 1/2004 | Rhoads |
| 2004/0158724 A1* | 8/2004 | Carr et al. .................. 713/186 |
| 2004/0162981 A1 | 8/2004 | Wong |
| 2004/0190750 A1 | 9/2004 | Rodriguez et al. |
| 2004/0240704 A1 | 12/2004 | Reed |
| 2004/0264733 A1 | 12/2004 | Rhoads et al. |
| 2005/0041835 A1 | 2/2005 | Reed et al. |
| 2005/0058318 A1 | 3/2005 | Rhoads |
| 2005/0111723 A1 | 5/2005 | Hannigan et al. |
| 2005/0141750 A1 | 6/2005 | Rhoads et al. |
| 2005/0169499 A1 | 8/2005 | Rodriguez et al. |
| 2005/0192933 A1 | 9/2005 | Rhoads et al. |
| 2006/0012562 A1 | 1/2006 | Pope et al. |
| 2006/0013435 A1 | 1/2006 | Rhoads |
| 2006/0041591 A1 | 2/2006 | Rhoads |
| 2006/0120562 A1* | 6/2006 | Fudge et al. .................. 382/100 |
| 2006/0251291 A1 | 11/2006 | Rhoads |
| 2007/0055884 A1 | 3/2007 | Rhoads |
| 2007/0108287 A1 | 5/2007 | Davis et al. |
| 2007/0110275 A1 | 5/2007 | Rhoads et al. |
| 2007/0276841 A1 | 11/2007 | Rhoads et al. |
| 2007/0276928 A1 | 11/2007 | Rhoads et al. |
| 2008/0121728 A1 | 5/2008 | Rodriguez |
| 2008/0133555 A1 | 6/2008 | Rhoads et al. |
| 2008/0292134 A1 | 11/2008 | Sharma et al. |
| 2009/0012944 A1 | 1/2009 | Rodriguez et al. |
| 2009/0125475 A1 | 5/2009 | Rhoads et al. |
| 2009/0286572 A1 | 11/2009 | Rhoads et al. |
| 2010/0045816 A1 | 2/2010 | Rhoads |
| 2010/0062819 A1 | 3/2010 | Hannigan et al. |
| 2010/0172540 A1 | 7/2010 | Davis et al. |
| 2010/0198941 A1 | 8/2010 | Rhoads |
| 2011/0007936 A1 | 1/2011 | Rhoads |
| 2011/0026777 A1 | 2/2011 | Rhoads et al. |
| 2011/0051998 A1 | 3/2011 | Rhoads |
| 2011/0062229 A1 | 3/2011 | Rhoads |
| 2011/0091066 A1 | 4/2011 | Alattar |

OTHER PUBLICATIONS

U.S. Appl. No. 60/600,618, filed Aug. 9, 2004, Brundage et al.
U.S. Appl. No. 60/327,687, filed Oct. 5, 2001, McKinley et al.
U.S. Appl. No. 11/060,919, (2005-0141750) Office Action dated Jul. 17, 2006.
U.S. Appl. No. 11/060,919, (2005-0141750) Response dated Jul. 28, 2006.
Nixon et al., "256X256 CMOS Active Pixel Sensor Camera-on-a-Chip," IEEE Journal of Solid-State Circuits, vol. 31(12) pp. 2046-2050, 1996.
Notice of Allowance dated Aug. 24, 2006 and Supplemental Response dated Aug. 7, 2006, each from assignee's U.S. Appl. No. 11/060,919.
Aug. 15, 2007 Notice of Allowance, Jul. 27, 2007 Amendment and May 3, 2007 Office Action, all from assignee's U.S. Appl. No. 11/622,202 (published as 2007-0110275).
Aug. 7, 2007 Restriction Requirement and Sep. 5, 2007 Amendment and Election, each from assignee's U.S. Appl. No. 11/672,330.
PCT/US2005/003777 Written Opinion of the International Searching Authority dated Jun. 14, 2007, 8 pages.
Office Action on Japanese Application 2006-552319, mailed Jun. 21, 2011 (English translation not available).
U.S. Appl. No. 09/343,101, filed Jun. 29, 1999, Bruce L. Davis, et al.
U.S. Appl. No. 09/343,104, filed Jun. 29, 1999, Tony F. Rodriguez, et al.
U.S. Appl. No. 09/413,117, filed Oct. 6, 1999, Geoffrey B. Rhoads.
U.S. Appl. No. 09/482,749, filed Jan. 13, 2000, Geoffrey B. Rhoads.
U.S. Appl. No. 09/507,096, filed Feb. 17, 2000, Geoffrey B. Rhoads, et al.
U.S. Appl. No. 09/552,998, filed Apr. 19, 2000, Tony F. Rodriguez, et al.
U.S. Appl. No. 09/567,405, filed May 8, 2000, Geoffrey B. Rhoads, et al.
U.S. Appl. No. 09/629,649, filed Aug. 1, 2000, J. Scott Carr, et al.
U.S. Appl. No. 09/633,587, filed Aug. 7, 2000, Geoffrey B. Rhoads, et al.
U.S. Appl. No. 09/689,289, filed Oct. 11, 2000, Geoffrey B. Rhoads, et al.
U.S. Appl. No. 09/697,015, filed Oct. 25, 2000, Bruce L Davis, et al.
U.S. Appl. No. 09/697,009, filed Oct. 25, 2000, Bruce L. Davis, et al.
U.S. Appl. No. 13/084,981, filed Apr. 12, 2011, Geoffrey B. Rhoads.

* cited by examiner

DIGITAL WATERMARKING IMAGE SIGNALS ON-CHIP

RELATED APPLICATION DATA

This application claims the benefit of U.S. Provisional Patent Application No. 60/542,095, filed Feb. 4, 2004, and 60/600,618, filed Aug. 9, 2004. This patent application is also related to U.S. patent application Ser. No. 10/053,488 (published as U.S. 2002-0120849 A1), filed Nov. 2, 2001. The 10/053,488 application claims priority to U.S. Provisional Patent Application No. 60/327,687, filed Oct. 5, 2001. The patent application Ser. No. 10/053,488 is also related to U.S. patent application Ser. No. 09/503,881 (now U.S. Pat. No. 6,614,914), filed Feb. 14, 2000. Each of the above U.S. patent documents is herein incorporated by reference.

TECHNICAL FIELD

The present invention relates to digital watermarking and stenography. In first implementations, the present invention relates to digital watermarking—on chip—signals produced from a CMOS or other image sensor. The present invention also relates to communication and image management. In second implementations, the present invention relates to watermarking images with location information (e.g., GPS data) to facilitate image management and creation of visual travel logs.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as image signals, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder (or "embedder") that embeds the watermark in a host media signal, and a decoder that detects and reads the embedded watermark from a signal suspected of containing a watermark (a suspect signal). The encoder embeds a watermark by subtly altering the host media signal. The physical manifestation of altered host media most commonly takes the form of altered signal values, such as slightly changed pixel values, image luminance, color or color values, picture colors, altered DCT coefficients, etc. The detector component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Example techniques for embedding and detecting imperceptible watermarks in media signals are detailed in the assignee's U.S. Pat. Nos. 5,862,260, 6,122,403 and 6,614,914, which are hereby incorporated by reference.

Some of the present methods and apparatus are provided to affect embedding a digital watermark (or other steganographic indicia) in signals created by a CMOS or other image sensor. Watermark embedding is preferably integrated "on-chip." The term on-chip is used to reflect that at least a portion of watermark embedding is facilitated through circuits, electronics or logic provided on silicon or other semiconductor structure associated or in communication with an imaging array. In some implementations the embedding circuitry is co-located with an image sensor array. In other implementations the CMOS sensor array communicates with embedding circuits on a remote chip location.

CMOS imagers are well known in the art, e.g., see U.S. Pat. Nos. 6,645,788, 6,654,057, 6,639,261, 5,708,263 and 5,471,515, which are each herein incorporated by reference. The literature is also full of illustrative work including, e.g., Nixon et al., "256×256 CMOS Active Pixel Sensor Camera-on-a-Chip," IEEE Journal of Solid-State Circuits, Vol. 31(12) pp. 2046-2050, 1996; and Mendis et al, "CMOS Active Pixel Image Sensors," IEEE Transactions on Electron Devices, Vol. 41(3) pp. 452-453, 1994, which are each herein incorporated by reference.

As discussed in at least some of the above-mentioned patents, a CMOS imager circuit may include a focal plane array of pixel cells, each one of the cells including a photo-detector, e.g., a photogate, photoconductor or a photodiode, overlying a substrate for accumulating photo-generated charge in the underlying portion of the substrate. A readout circuit is connected to pixel cells and may include an output field effect transistor formed in the substrate and a charge transfer section formed on the substrate adjacent the photogate, photoconductor or photodiode having a sensing node, typically a floating diffusion node, connected to the gate of an output transistor. The imager may include an electronic device (such as a transistor) for transferring charge from the underlying portion of the substrate to the floating diffusion node and a device for resetting the node to a predetermined charge level prior to charge transference. In an exemplary CMOS imager, the active elements of a pixel cell preferably perform functions, e.g., of: (1) photon (e.g., light) to charge conversion; (2) accumulation of image charge; (3) transfer of charge to the floating diffusion node accompanied by charge amplification; (4) resetting a floating diffusion node to a known state; (5) selection of a pixel or image area for readout; and (6) output and amplification of a signal representing pixel charge.

A communications channel (or "grid" including rows and columns) overlays most, if not all, of a pixel array to apply timing, control and read out signals and an array of column output signal interconnects. Column lines connect to electronics that are arranged by column outside of the pixel array. This type of architecture allows signals from the entire array, a portion of the array (e.g., rows or pixel windows), or a single pixel in the array to be read out by simple X-Y addressing or row/column clocking.

(Of course, our inventive watermarking techniques apply to other on-chip imagers including CCD sensors and other CMOS configurations. Thus, the above imager description illustrates only a few of the many possible on-chip environments in which our inventive techniques flourish. As will be appreciated by those of ordinary skill in the art, there are many other on-chip environments that are suitably interchangeable with our watermarking methods and apparatus.).

A first aspect of the invention is a method of introducing a digital watermark component to imagery generated by an image sensor (e.g., a CMOS or other image sensor). The image sensor includes a plurality of pixels. The method includes providing slight variations to physical characteristics of a set of the plurality of pixels. The variations are provided so as to introduce the digital watermark component during image capture. The method further includes generating imagery with the image sensor. The imagery includes the digital watermark component.

Another aspect of the invention is a method of embedding a digital watermark in image data captured by an imager. The watermark embedding occurs on-chip with the imager, and the imager includes a plurality of pixels. Each of the plurality of pixels is filtered to represent a single color. The method includes, prior to approximating a multi-color value for each pixel, adjusting single color values for select pixels. The adjusting introduces a digital watermark into the image data. The method further includes approximating a multi-color value for each pixel.

GPS or location data can be provided to a watermark embedder located, e.g., on-chip with or external to, an image sensor. The watermark embedder can embed the GPS coordinates or other location data, perhaps with a timestamp, in data captured by the image sensor. Location data can be combined or associated with an operator or photographer identifier (e.g., a plural-bit identifier) to even further identify imagery captured by the image sensor.

Accordingly, yet another aspect of the invention is a method including: i) receiving an image including a digital watermark embedded therein, wherein the digital watermark comprises location information; ii) decoding the digital watermark to obtain the location information; iii) identifying a map depicting a location corresponding to the location information; and iv) providing the map for access over a computer network.

Still another aspect of the invention is a method of visually or graphically identifying locations on a map. The map is to be displayed via a computer display. The method includes receiving data representing a first image, and analyzing the data to obtain information steganographically encoded therein. The information includes or links to first location information associated with the first image. The method further includes providing a map including an area associated with the first location information, wherein the map is to be displayed via a computer display, and identifying a first location on the map that is associated with the first location information. In some implementations identification of a first location includes providing a visual or graphical object on the map at or near a map location that is associated with the first location information. In some cases the object includes a representation (e.g., a "thumbnail") of the first image.

Another aspect of the invention is a method of representing a geographically location. The method includes receiving an image captured from a first cell phone. The image includes location information steganographic embedded therein. The method further includes decoding the steganographic embedding to obtain the location information; by using the location information or information identified by the location information, identifying a map representing a location associated with the location information; and displaying the map. In some implementations the method includes displaying a visual or graphical object on the map to identify the location. The object may include a representation of the image.

Further features, advantages and aspects of the present invention become even more apparent with reference to the following detailed description and accompanying drawings.

BRIEF DESCRIPTION OF THE DRAWINGS

FIG. 8C illustrates the second device showing a corresponding map with which the image corresponds to.

DETAILED DESCRIPTION

Introduction

The detailed description is organized into two main sections: i) embedding auxiliary information on-chip in, e.g., CMOS sensors; and ii) watermarking location information in images and related applications. The division into sections (and subsections) is not intended to limit the scope of the present invention. We imagine that methods and apparatus discussed under one section can be readily applied and combined with method and apparatus discussed under another section.

Embedding Auxiliary Information On-Chip

CMOS Imager Array

Figure 1:
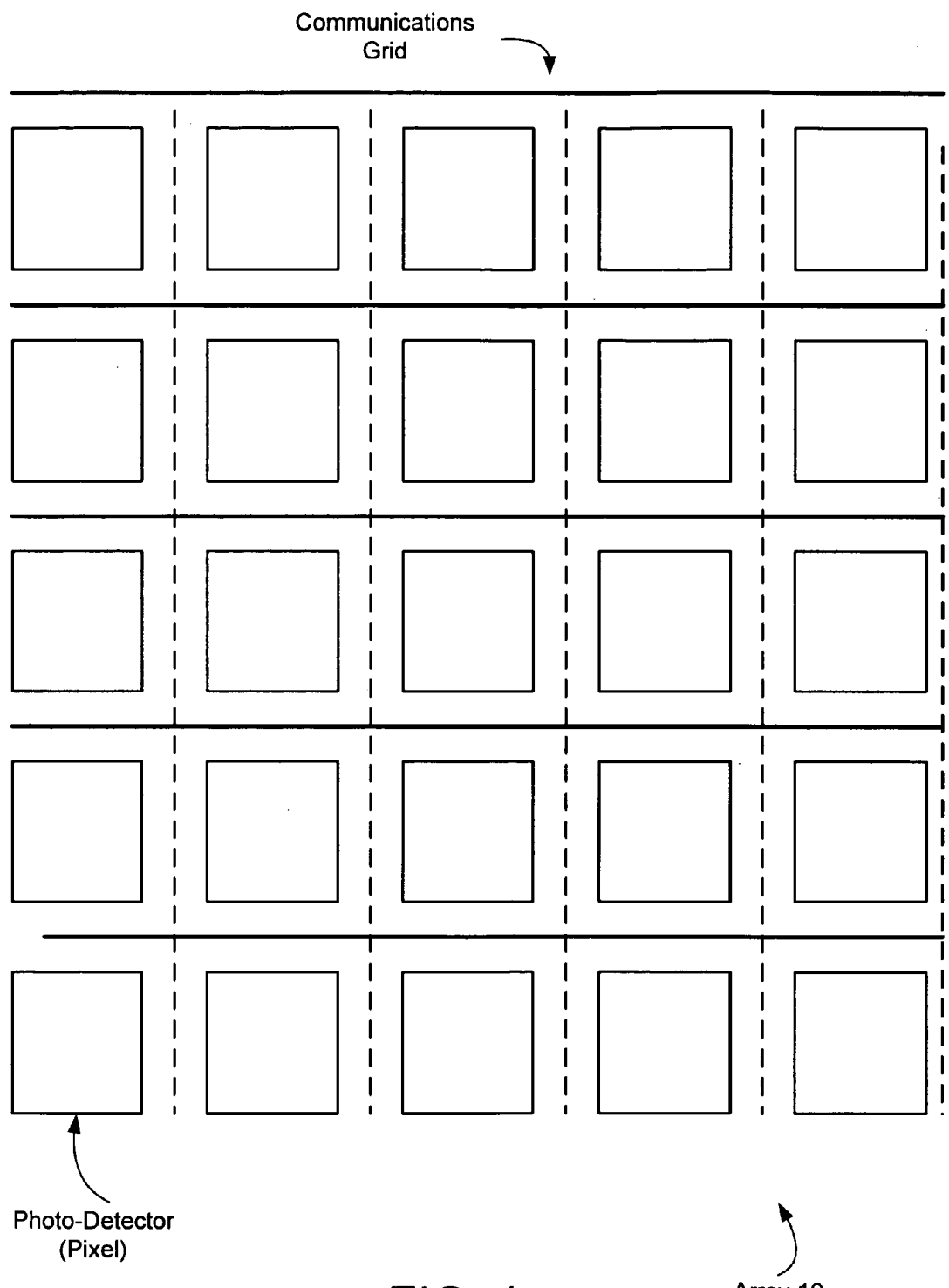
FIG. 1 is a block diagram illustrating a CMOS pixel array.

FIG. 1 is a general block diagram of a CMOS imager array 10. The array 10 includes rows and columns of photo-detectors. Each photo-detector preferably corresponds with an image pixel. Each photo-detector may include active circuitry, e.g., a signal amplifier (allowing for a so-called "active-pixel sensor"). While the array 10 is illustrated as including twenty-five photo-detectors, it will be appreciated that an actual imager array may include millions of photo-detectors. The array 10 includes a communications network or signal grid to allow image or pixel information to be read out from pixel locations. The network may even allow for a pixel window, block of data, or rows to be output from the array. A window selection (or direct random access ability) allows a CMOS sensor to intelligently choose to readout select groups of pixels rather than the entire sensor array. Of course the array 10 may cooperate with a variety of other circuitry including, e.g., timing control, row and column drivers, decoders, analog to digital converters, color converters, memory, etc.

Photodetectors typically record intensity of light from full black to white, with appropriate intervening gray. To provide color, a layer of color filters is provided over an array of photo-detectors. For color imagers, each photo-detector cooperates with a color filter (e.g., red (R), green (G) or blue (B)) or a portion of a color filter array (CFA). As photons pass through the filter to reach the photo-detector, only wavelengths corresponding to a particular color lens reach the photo-detectors. The filters can be arranged in a predetermined pattern, e.g., the Bayer pattern:

| G | R | G | R | G |
|---|---|---|---|---|
| B | G | B | G | B |
| G | R | G | R | G |
| B | G | B | G | B |

Raw color data is read out from the array (e.g., row by row or via window selection). The raw color data is processed, e.g., amplified, adjusted, converted, etc. A color converter converts color data into RGB values per pixel. Color values for individual pixels are determined through various forms of estimation (e.g., interpolation, quadratic estimation, cubic spline, linear, nearest neighbor comparison, etc.). For example, a 24-bit value per pixel is determined (8-bits for red, 8-bits for green and 8-bits for blue). This color conversion is typically performed on-chip. (Some CMOS designs call for color conversion co-located with the pixels themselves, while other designs communicate image data to a color converter or other on-chip image processing circuitry.) RGB image data is provided from the chip or imager as an output. Of course, instead of RGB values, a CMY conversion could be undertaken as well.

(For a monochrome imager—or more precisely a "panchromic imager"—each pixel value corresponds to a gray-scale value. The gray-scale value per pixel is output from the chip, perhaps after signal processing.)

Of course, a CMOS sensor may also include a compression module (e.g., JPEG or MPEG) for compressing image data.

Watermarking Image Data

Assignee Digimarc Corporation has previously contemplated the manifestation of watermark functionality through dedicated hardware as discussed, e.g., in U.S. Pat. Nos. 5,862,260, 6,674,876 and 6,549,638, and contemplated watermarking circuitry being co-located on chip with CMOS imagers, e.g., as discussed in U.S. Pat. No. 6,650,761. Each of these patent documents is herein incorporated by reference.

Some improvements and alternative arrangements are detailed herein.

Figure 2A:
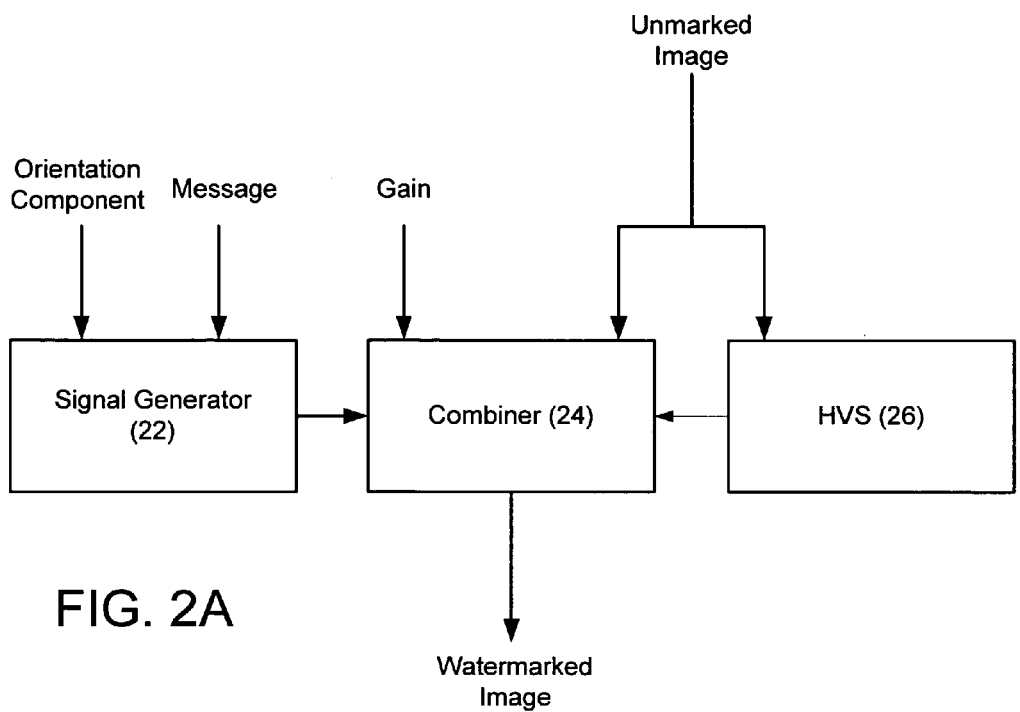
FIG. 2A is a block diagram for one implementation of an on-chip watermark embedder.

With reference to FIG. 2A, we provide a digital watermark embedder co-located on-chip to watermark image data. In one implementation the watermark embedder includes a Signal Generator 22 and Signal Combiner 24. The Signal Generator 22 receives an orientation component and message as inputs. An orientation component helps to make a watermark more robust to geometric distortion (e.g., scaling, rotation, translation, etc.), or may help identify certain message bits.

One type of watermark orientation signal is an image signal that comprises a set of impulse functions in a transform domain, like a Fourier magnitude domain, e.g., each with pseudorandom phase. To detect rotation and scale of a watermarked image (e.g., after printing and scanning of the watermarked image), a watermark decoder converts the watermarked image to the Fourier magnitude domain and then performs, e.g., a log polar resampling of the Fourier magnitude image. A generalized matched filter correlates a known orientation signal with the re-sampled watermarked signal to find the rotation and scale parameters providing the highest correlation. A watermark decoder performs additional correlation operations between the phase information of the known orientation signal and the watermarked signal to determine translation parameters, which identify the origin of the watermark message signal. Having determined the rotation, scale and translation of the watermark signal, the reader then adjusts the image data to compensate for this distortion, and extracts the watermark message signal, if any. Alternative orientation components include a predetermined start string or message property which aids message detection. Still other orientation components are known to those of ordinary skill in the art and can be suitably interchanged with related aspect of the invention.

The Signal Generator 22 provides a watermark signal to the Combiner 24. The Combiner 24 combines watermark signal with image data. The image data may correspond with: i) RGB (or CMY) data after color conversion; ii) raw, pre-color conversion, data (e.g., pre-Bayer pattern reconstruction); or iii) compressed color converted image data. The Combiner 24 outputs an embedded or watermarked image signal. The Signal Generator 22 may provide raw data bits to Combiner 24 or even a more sophisticated signal, such as an image data block or line. The message can be error corrected and spread or expanded, and in some implementations the message and orientation components are provided as a combined signal.

If embedding pre-color conversion data, a watermark embedder may use knowledge of an expected color conversion process (e.g., interpolation) to help efficiently embed a watermark signal. For example, a 24-bit color value for a first pixel may have color contribution from adjacent or neighboring pixels. A watermark embedder may tweak (or adjust) data from multiple pixels that will ultimately affect the first pixel's 24-bit color value. Similarly, a watermark decoder may then use knowledge of a color conversion process to ensure proper detection. Or is a color conversion is expected to use an interpolation, the embedder may use this knowledge to weight or adjust certain pixels relative to other pixels so as to convey a watermark in the post-interpolated color data.

Figure 3:
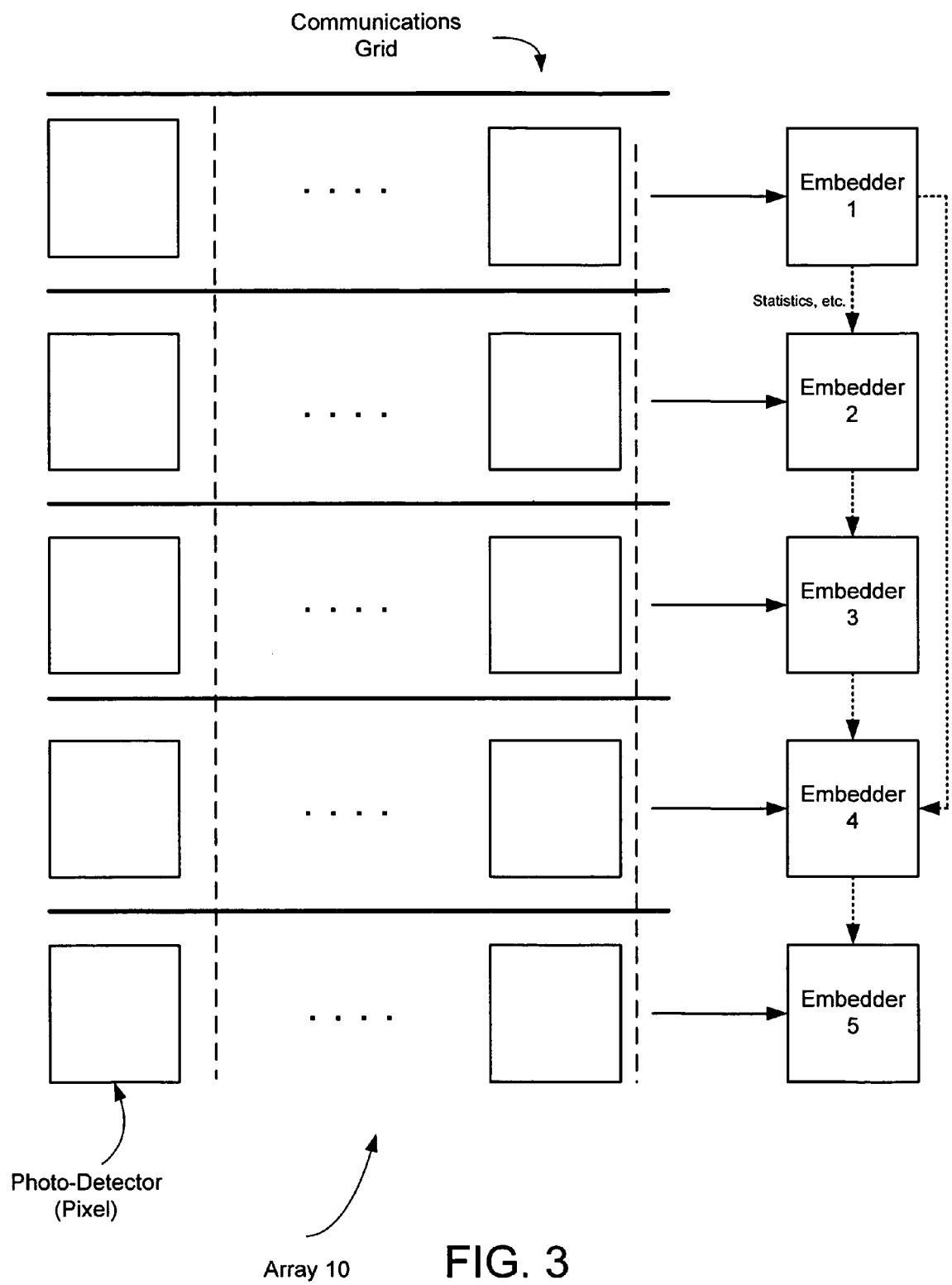
FIG. 3 illustrates on-chip parallel watermark embedding modules.

Embedding pre-color conversion data also efficiently facilitates embedding image data, row-by-row or block-by-block. Embedding can also take place in parallel, as shown in FIG. 3, wherein multiple embedding units are provided. Multiple embedding units, while they may take up more chip space, significantly reduce embedding time. Prior to color processing, image data is embedded by separate embedders. First embedding units may, optionally, communicate image data statistics to later or following embedders (shown with the dotted arrows in FIG. 3). The later or following embedders use the statistics to (e.g., color properties, noise analysis, sensor characteristics, variance, etc.) as inputs to adjust their embedding process. Such adjustments may, e.g., increase or decrease watermark signal strength, alter or switch between different embedding protocols or even isolate certain image regions for selective embedding. We discuss above how certain imagers may allow for image windows (e.g., a block of pixels) to be read from an image array. One improvement is watermark only pixels within a block that is selected from an image array. Once the window is selected, pixels within the window are communicated to one or more watermark embedders. The watermark may include an array location to help identify where in the array the pixel window was extracted from.

Another useful tool in watermark embedding and reading is perceptual analysis. Perceptual analysis refers generally to techniques for evaluating signal properties based on the extent to which those properties are (or are likely to be) perceptible to humans (e.g., listeners or viewers of the media content). The illustrated watermark embedder (e.g., blocks 22 and 24 in FIGS. 2A and 2B) can optionally include or cooperate with a Human Visual System (HVS) model 26 to determine where to place a watermark and how to control the intensity of the watermark so that chances of accurately recovering the watermark are enhanced, resistance to tampering is increased, and perceptibility of the watermark is reduced. Such perceptual analysis can play an integral role in gain control because it helps indicate how the gain can be adjusted relative to the impact on the perceptibility of the watermark. Perceptual analysis can also play an integral role in locating the watermark in a host signal. For example, one might design the embedder to hide a watermark in portions of a host signal that are more likely to mask the watermark from human perception.

Various forms of statistical analyses may be performed on a signal to identify places to locate the watermark, and to identify places where to extract the watermark. For example, a statistical analysis can identify portions of a host image that have noise-like properties that are likely to make recovery of the watermark signal difficult. Similarly, statistical analyses may be used to characterize the host signal to determine where to locate the watermark.

Each of the techniques may be used alone, in various combinations, and in combination with other signal processing techniques.

The watermark may be embedded in one or more of the color components of an image. For example, when embedding pre-color reconstructed image data, a watermark may be selectively embedded only in the red channel. Or, a weighting scheme may distribute a watermark only between the red and blue and/or green channels. In some implementations, the embedder may transform the input image into a target color space, and then proceed with the embedding process in that color space.

Message

Since watermark embedding is occurring on-chip, there are several different ways to efficiently facilitate message creation.

In a first implementation a message is static. That is, the message is the same for all images. The static message is uniquely associated with particular silicon manufacturing mask, manufacturer, intended customer, or even a particular chip batch run. The message is stored, e.g., in on-chip registers or ROM and embedded in each image produced by the image sensor.

In another implementation, a message has a static component and a dynamic component. The dynamic component can be provided by a number of different methods. For example, if a CMOS chip includes EPROM-like fuses, particular fuses are blown to create a unique identifier. More likely is for a CMOS chip to include or communicate with RAM. The dynamic identifier is provided from RAM (or another interface) for embedding.

In still another implementation, an entire watermark payload is dynamic. That is, the message is unique for each image, for a set of images or personalized for a particular user or application. For example, the watermark message may include unique plural bits that identify a particular cell phone or sensor in which the imager is incorporated. The unique plural bits are communicated to the embedder for embedding in image data. In other implementations the unique plural bits correspond to a user's biometric. The biometric is embedded in the imagery. For example, a cell phone includes or communicates with a fingerprint reader. The fingerprint reader captures a user's fingerprint. The fingerprint is hashed or otherwise represented, e.g., as discussed in assignee's U.S. patent application Ser. No. 10/893,141, filed Aug. 7, 2003 (published as US 20050063562 A1), which is herein incorporated by reference. The hash or representation is used as a watermark component which ties the imagery to a user or photographer. Instead of a biometric a user may be required to enter her PIN or password prior to device operation. The user is identified from such and a user ID is embedded in each image.

Fixed Orientation Component

Figure 2B:
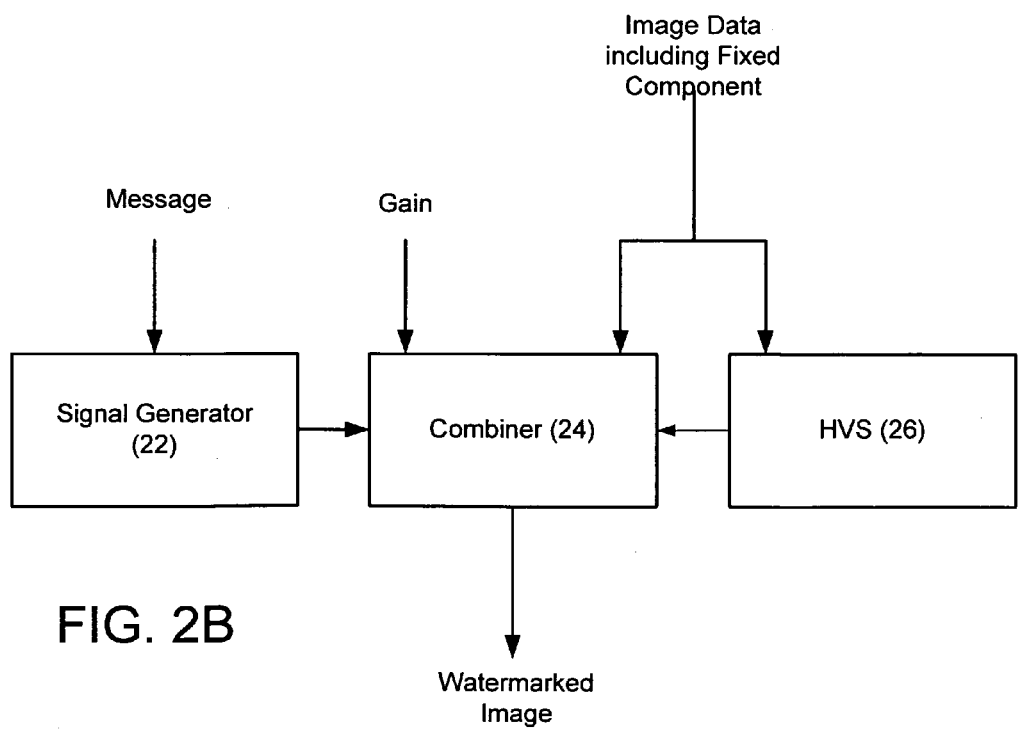
FIG. 2B is a block diagram for another implementation of an on-chip watermark embedder.

We can reduce embedding time and gate complexity by introducing a steganographic orientation component during image data capture, instead of tweaking captured image data to embed such an orientation component at a later embedder stage. To accomplish this we introduce slight physical variations to a set of photodetectors located in an image array during chip manufacture. The variations provide a subtle image characteristics (e.g., color changes) or value offsets—analogous to subtle fixed pattern noise. The variations need not be the same from pixel to pixel, and may vary to achieve a fixed orientation component. The variations are introduced to the pixel array in a predetermined pattern corresponding to an orientation component. Thus, collectively, the offset values introduce an orientation component in the image data. Of course, the orientation component can be repeated, e.g., in 64×64 or 128×128 pixel blocks, across the sensor array. The variations can be provided in a number of ways, including changing the potential, doping or characteristics of select photodiodes or photogates to introduce image data offsets during the manufacture process. These image offsets are slight—preferably imperceptible to a human observer of resulting image data, while still collectively conveying a steganographic component in captured imagery. The variations introduce a fixed watermark component in all imagery captured by the image sensor. With reference to FIG. 2B, image data including a fixed watermark component is provided to a watermark embedder. The embedder receives a variable component (e.g., a message) and embeds the variable component in the image data. If, for example, the fixed component includes a watermark orientation component, the variable component is preferably registered with the fixed component and then embedded in imagery. Registration of the variable component with the fixed component is simplified since the embedder knows how (and where) the fixed component is aligned in the sensor array.

Instead of changing the physical characteristics of a photodetector, an orientation component can be similarly introduced by altering a set of color filters or microlens. A pattern is designed to correspond with an orientation component. The altered filters or microlens are then arranged in the pattern to convey the orientation component. (For example, the altered lens or filter may provide a subtle color value offset. Collectively, a set of the offset values is sufficient to convey the orientation component in the captured image data itself. Thus, a CMOS sensor is manufactured so as to embed a machine-readable feature during the process of image capture itself.)

Still further, in so-called active-pixel sensors, where each photo-sensor (pixel) cooperates with an amplifier, an orientation component is introduced by providing different signal amplifications values. That is, a set of amplifiers is arranged to introduce a subtle signal variation to image data. Thus, a fixed watermark component (e.g., an orientation component or fixed payload or message component) is conveyed through signal amplification at the pixel level of an image sensor.

In addition to reducing gate or circuitry complexity, introducing a fixed watermark orientation component during image capture allows for manufacturing quality control. For example, an image sensor is illuminated with white light. The resulting image data from the image sensor is read out and a watermark detector searches the image data to detect the orientation component. The orientation component is evaluated to ensure sensor integrity. (For example, if the orientation component is undetectable, or is detected in a degraded manner, a sensor defect is likely present.).

Instead of (or in addition to) an orientation component, a fixed payload or message component can be introduced during image capture. The fixed payload may represent a chip batch or lot number, manufacturing process, chip type, intended recipient, creation date or location, etc.

Adjusting Embedding Based on Chip Characteristics

A watermark embedder (or HVS module) can be configured to take advantage of chip characteristics. For example, embedding is adjusted based on silicon characteristics or color processing. If the embedder (or HVS) determines the existence of fixed pattern noise, the embedding can use the noise to guide or mask embedding locations. The embedder (or HVS) can track statistics and image quality and make adjustments to compensate or increase imperceptibility.

Moreover, if the embedder/HVS (or a plurality of embedders) are embedding or evaluating row-by-row or window-by-window, an embedder can gather image statistics regarding image data and use this data for embedding rows to come, or pass the statistics to other embedding modules. Multiple embedders also allow for enhanced rate control. As an example, if a system employs an embedder for each row of pixels (which pixels are embedded as they are clocked out), a rate-control algorithm can be imposed to ensure that for any given frame (or row) a fixed rate is achieved and that it is optimized for not only visibility, but resulting size of compressed bitstream. This allows an individual embedder to manage an amount of entropy per frame/window/row so as not to adversely affect compressed size.

Additional Applications

Image Authentication

A sensor imager may optionally include additional circuitry to characterize image data. For example, the characterizing circuitry may generate a digital signature or hash (or fingerprint) of an image or a subset of the image. The signature or hash is embedded as a component of a digital watermark. (We preferably use an algorithm that is insensitive to watermark embedding. That is, a signature or hashing algorithm will generate the same hash or signature despite the presence of a digital watermark embedded therein.). The signature or hash helps to establish whether the image has been tampered with. In some implementations we identify low frequency JPEG values and embed those values into image data, along with a date, time and location. The JPEG values, date, time and location serve to identify the image. Hashing can also provide detailed (e.g., row by row) image authentication. For example, we can generate a hash of a first row or block of pixels (e.g., based on color values or pre-color converted pixel values). The hash is embedded in a subsequent row or block of pixels. The process preferably continues to allow for each row or block of pixels to be hashed, with the hash being embedded as a watermark component in subsequent rows or blocks. If a pixel or row is altered, it will no longer correspond to the hash of that pixel or row. This method can be applied to post-compressed data as well. A hash is generated to represent a block of compressed image data. The hash is stored in a subsequent block of compressed data.

In another implementation, an embedder is integrated into the imager of a web camera. The image or video stream of the web camera carries an embedded digital watermark, either dynamic or static as above. A dynamic message component is provided from a host computer rather than a stand-alone web camera. This implementation supports secret messaging for consumers, or time stamping or otherwise tagging video for video management on a computer server, or even to help authenticate a video source. From a watermark detecting side, a web camera may include optimizations to help read a watermark. For example the web camera includes watermark preprocessing circuitry co-located with its image sensor. The circuitry may identify the presence of watermarking without decoding the watermarking and signal to a watermark detector to look closely at the particular imagery. The circuitry may also include hardware accelerations to speed watermark detection, or a protocol for handling keys and encryption to create private systems.

If the watermark includes an orientation component, image data can be realigned, on-chip, to compensate for distortion relative to an expected orientation of the orientation component. This feature can be used for video stabilization (like a so-called "steady-cam" feature in some video cameras). That is, received image data is adjusted to better align to the watermark's expected orientation (e.g., in terms of rotation, scale and translation). An image sensor includes a digital watermark decoder. The decoder decodes watermarks to recover orientation information (relative to an expected or base orientation). The orientation information is provided to a controller (e.g., logic gates) which controls the image sensor to realign the data. Control may include shifting image data in the array (a buffer can be used to help move the data around), altering detector gain, interpolating image data, etc. Thus, image data can be rotated or scaled—on chip—to compensate for a jittery photographer.

In encryption implementations, where at least a portion of a digital watermark component is encrypted, keys for encryption and keys for access to the digital watermark can be managed either internal or external to an on-chip watermark embedder. Externally, an encryption key can be supplied through hardware or firmware interface, which is communicated to an on-chip watermark embedder. Internally, an encryption key and even static payload portions preferably reside in on-board ROM, programmed during production or manufacturing of the CMOS sensor/embedder.

In addition to the combinations recited in the claims, a few additional combinations include:

A1. A method of embedding a steganographic component in imagery captured by an image sensor, wherein the image sensor comprises a plurality of rows of image detectors, with a first steganographic encoder associated with at least a first row of image detectors and a second steganographic encoder associated with at least a second row of image detectors, wherein the first steganographic encoder and the second steganographic encoder are co-located with the image sensor, said method comprising:

embedding steganographic data in imagery captured by the first row of image detectors with the first steganographic encoder; and embedding steganographic data in imagery captured by the second row of image detectors with the second steganographic encoder.

A2. The combination of A1, further comprising gathering information associated with at least one of: i) image data captured by the first row of image detectors; ii) operation or characteristics of the first row of image detectors; and iii) the first steganographic encoder.

B1. An image sensor comprising:

a controller;

an image sensor array;

at least one watermark detector co-located with the image senor array, wherein the watermark detector operates to decode digital watermarks from imagery captured by the image sensor array, wherein the digital watermarks comprise an orientation component, and wherein the watermark detector provides orientation information, relative to an expected watermark orientation, to the controller, and wherein said controller operates at least to adjust imagery captured by the image sensor array according to the orientation information.

B2. A video camera including the image sensor of B1.

B3. The combination of B1 or B2, wherein the controller stabilizes video captured by the image sensor.

C1. A method of marking image content captured by an image sensor comprising:
   generating a first reduced-bit representation of a first group of pixels;
   generating a second reduced-bit representation of a second group of pixels;
   embedding the first reduced-bit representation in the second group of pixels; and
   embedding the second reduced-bit representation in a third group of pixels.

C2. The combination of C1, further comprising generating a reduced-bit representation for each group of pixels in the image content and embedding the reduced-bit representations in different groups.

Embedding Location Data

Assignee's U.S. Published Patent Applications 2002-0122564 A1, 2002-0124024 A1, 2002-0124171 A1 and 2004-0008866 A1, U.S. Pat. No. 6,664,976 and published PCT Application No. WO 02/071685 include details regarding embedding location information (e.g., GPS data) in image and video data. Each of these patent documents is herein incorporated by reference. We disclose additional improvements herein.

GPS or location data can be provided to a watermark embedder located on chip with a CMOS sensor. (Of course, the applications discussed below are device-type independent. Instead of a CMOS sensor, we could use a CCD or other image sensor. For consistency—and not by way of limitation—we will usually refer to an image sensor as a "CMOS" sensor.) The watermark embedder embeds the GPS coordinates or other location data, perhaps with a timestamp, in data captured by the CMOS array. Location data can be combined or associated with an operator or photographer identifier (e.g., a plural-bit identifier) to even further identify imagery captured by the CMOS array. A camera can also create a list or log of images taken, correlated by a depicted geo-location and/or a digital watermark identifier. The log can be secured, e.g., with encryption and conventional digital signatures. The secure log is communicated to a trusted party, who can then verify, via crosschecking an embedded location/timestamp or watermark identifier with the secure log, whether a particular image corresponds to the log.

GPS embedded imagery can be used as a front end (or index) into a data repository or service like the service provided by direction guru MapQuest. For example, a CMOS camera cell phone captures an image at a particular geo-location. A GPS or other location data generator generates location information. The location information is provided to an on-chip watermark embedder that embeds the location information in the corresponding image captured by the CMOS camera. The embedded image is provided to MapQuest (or to an image management service or software application). A MapQuest server includes a watermark detector to decode a watermark in the image to recover the location data. MapQuest tracks and manages images and related information (e.g., maps) based on the location data, e.g., depicted image location and image capture time/day.

MapQuest (or another service or application) can then provide a number of useful services. In one implementation, embedded location data is used to identify a corresponding location on a map. Consider an image depicting Bear Lake in Idaho. The image includes a digital watermark embedded therein with geo-coordinates associated with Bear Lake. Once decoded, the watermark location information is used to identify a map depicting the same or similar geographical area. The map is provided to the user through a computer (e.g., internet or intranet) or cellular network. If the user provides her current location via a graphical user interface (e.g., cell phone or PC-based web browser) MapQuest can generate directions from the user's location to the watermark location, i.e., Bear Lake.

Another implementation associates related imagery based on their geo-locations. For example, a user queries an image management service, archive or application to determine whether it includes any images that are geographically similarly-located to a user provided (or selected) image. The service (or application or archive) decodes a digital watermark from the user provided or selected image to obtain location data. (Alternatively, the user's computer decodes the watermark and forwards only the decoded location data.) The location data is used to index an image archive to retrieve related images.

A further improvement allows a user to select images based on geo-location or image conditions. For example, if the user likes a particular picture of Bear Lake, maybe she would enjoy another picture of the same location, but from a different angle, or different time of day, or even captured during a different season. These desired characteristics can be provided, along with a geo-location through a service interface. Of course, the service can establish a geo-location via an embedded image provided by the user via the service interface. Or, if the user is interested in shore erosion over the last 50 years, she may then request a picture of the same shoreline and image capture angle, but from 50 years ago. Digital watermarking provides a backbone for such a system. In preferred implementations an embedded digital watermark includes the information, e.g., location, camera angle, date/time, season, depicted subject matter (e.g., lake, waterfall, grandkids, etc.); but, of course, the watermark may include a subset of such information and/or may include an identifier that is used to link to the information. The image may also include multiple watermarks. For example, a first watermark is embedded (on-chip) during image capture and includes location and capture time information, while a second watermark is embedded after image capture (off-chip) and may include more refined geo-coordinates and/or subject matter or key words.

Figure 4:
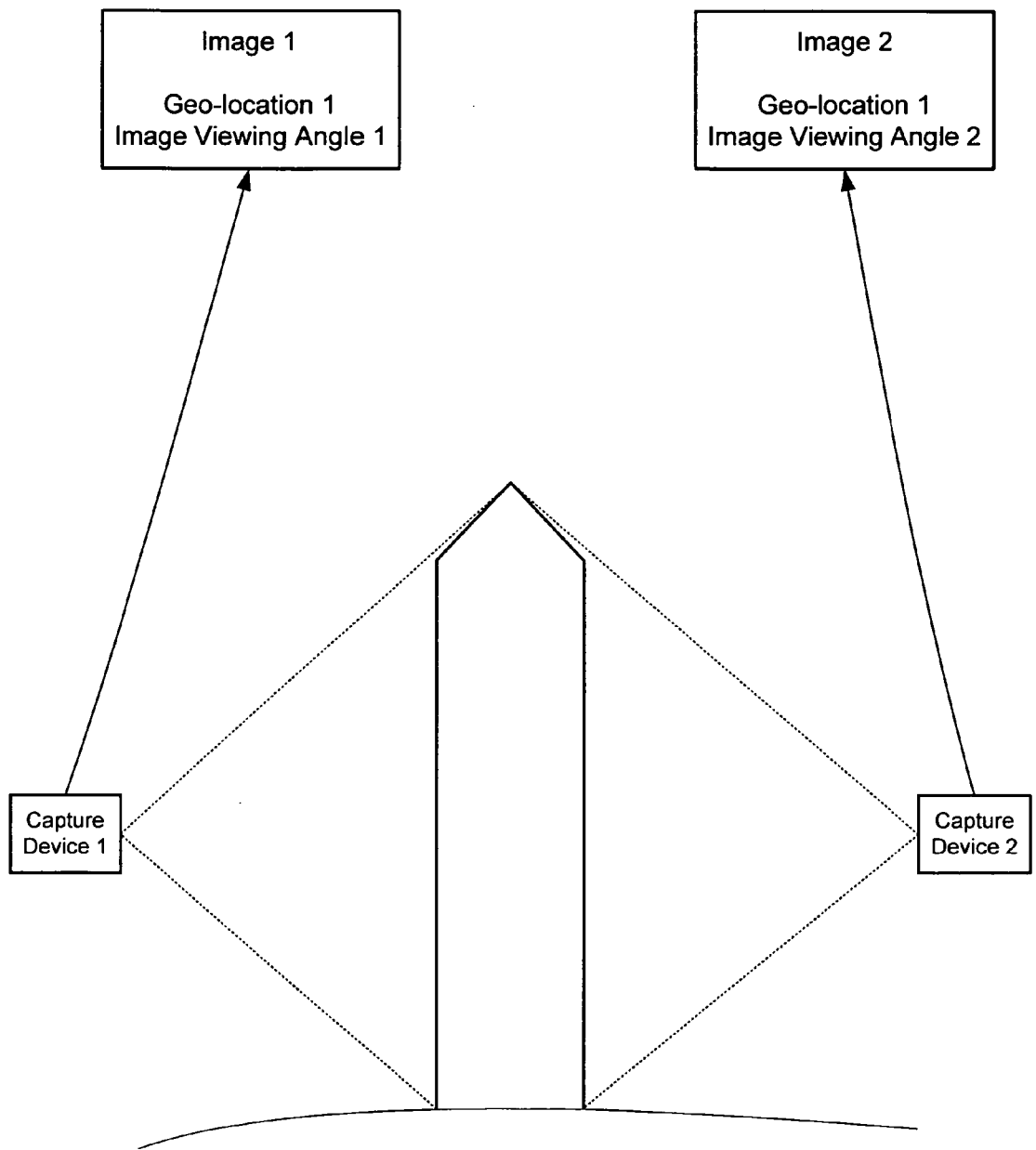
FIG. 4 illustrates image capture of a similar geo-location, but from different camera angles.

Another example is discussed with reference to FIG. 4. Two images are captured of the Washington Monument, each from a different viewing angle. The images depict the same geo-location (or similar geo-location within an excepted tolerance). A digital watermark is embedded in each image. The digital watermark includes the geo-location and viewing angle (e.g., South or North, etc.) for each depicted image. The embedded information is used to identify the geo-location (i.e., the Washington Monument) and which viewing angle is shown (e.g., depicting a South by South-West viewing angle).

Finding Related Imagery

Now consider these and other photographs available in a file-sharing network (e.g., Napster like) environment. A central server communicates with a plurality of user computers. Each of the user computers includes images stored thereon. The images include digital watermarks embedded therein with at least related location information. The watermark information is decoded (preferably by the user computers, but alternatively by the central server) to obtain the location information. The location information is used as an index or identifier and is stored by the central server. The central server maintains a listing of location information and corresponding internet addresses of where the images are located. Users interface with the central server and query the listing with desired geo-coordinates. (Alternately, the user may query with text terms (e.g., Bear Lake or Washington Monument) for which the server identifies corresponding geo-coordinates.). The central server provides a listing of related images for user access.

Consider the possibilities.

A user already has a picture of the Washington Monument from Viewing Angle 1 (see FIG. 4), but would like a complementary photograph from Viewing Angle 2. The user queries the filing sharing network (or a centralized database) with the watermark location information and the second viewing angle specifics. Candidate photographs are returned to the user for selection. Now consider an amateur photographer who takes a picture of the finish line at the Kentucky Derby (2004) as the wining horse gallops by. When the photographer arrives home, she finds that her photo-finish picture is blurry or blocked. But not to worry, if using our inventive techniques, the photographer goes on-line and searches for the same GPS location, at the same time/date to find a better or related picture. The photographer may also specify an alternative image capture angle to find images from a different viewing perspective. Embedded location and time information provide the basis for such functionality. (Since the photographer's camera embedded geo-location information in her blurry or blocked image, the photographer or photographer's watermark decoder extracts the watermark—revealing the location and time—and use the extracted watermark (or information contained therein) as an index or search term to ensure the same geo-location and time are searched.).

Another implementation is illustrated by a vacationer who snaps a low resolution image of a bluff overlooking the Pacific Ocean. Since the low resolution includes geolocation information steganographically embedded therein (e.g., longitude, latitude, date, time, and/or viewing angle, etc.) the vacationer can find a higher-resolution image, perhaps online, that corresponds to the lower-resolution image. (The details are straight forward at this point in this patent document: a watermark decoder finds and decodes a digital watermark that is steganographically embedded in the low-resolution image. The digital watermark includes or links to location information. The location information is provided to a database or image search engine, which finds other images that correspond with the geocoordinates of the low-resolution image. The vacationer peruses the images and selects one or more higher resolution images. These images can be added, e.g., to the vacationer's photo album, e.g., paper, DVD or electronic album.).

Travel Log and Picture Management

Figure 5:
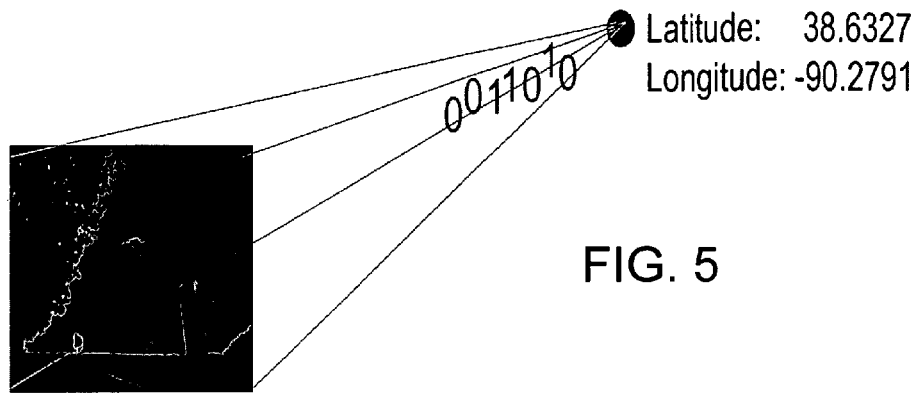
FIG. 5 illustrates an image including location information encoded therein.

Digital watermarking is used to help create a travel log, visual representation of a trip and/or to aid in graphical picture management. For example, a traveler takes pictures while vacationing in the Western United States of America. The traveler takes her pictures with a GPS-equipped camera (or a camera receiving or communicating with location information). Instead of a GPS-equipped camera, the camera can use a triangulation approach common in some cell phones. For example, the camera (e.g., a cell phone including a camera) receives location information from a cell tower, which is typically derived based on reception of cell phone signals at a plurality of cell towers. Regardless of the source of the location information, the location information is steganographically embedded in images taken by the camera (FIG. 5). Our preferred form of steganographic embedding is digital watermarking. The location information can even be redundantly embedded in the images.

Figure 6:
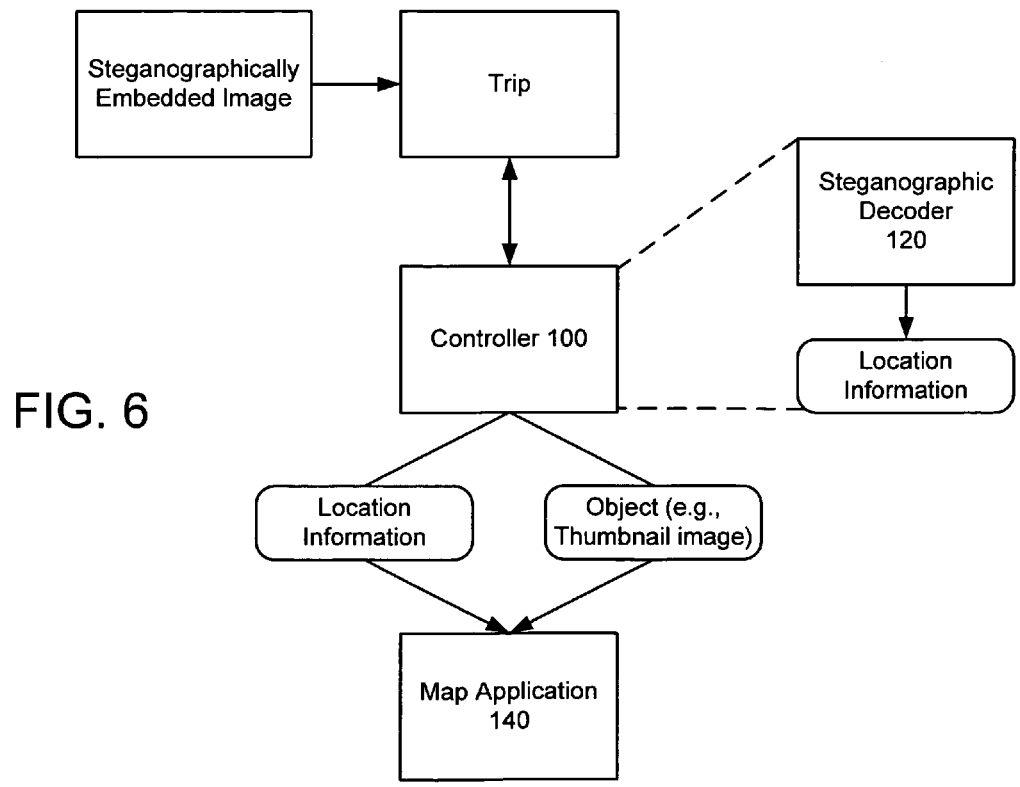
FIG. 6 is a block diagram illustrating interaction of a controller with a map application.

The traveler transfers or communicates (e.g., wirelessly) the steganographically embedded photographs to a computer resource, directory or file (FIG. 6). By way of illustration, we'll call this computer resource, directory or file, "Trip." A controller 100 (e.g., a software application, software plug-in, processor under the control of software, or software or hardware module) includes or cooperates with a steganographic decoder 120 (e.g., a digital watermarking decoder). The decoder 120 analyzes the images in the Trip directory to decode the embedded location information (e.g., longitude and latitude, and/or other geocoordinates and/or metadata associated with the images or objects depicted in the images).

The controller 100 cooperates with a map software application 140 (e.g., MapPoint or Pocket Streets provided by Microsoft, online GeoSnapper.com, or Keyhole products by Keyhole, Inc., etc.). In some implementations the controller 100 is integrated in or associated with (e.g., as a plug-in) the map software application 140 itself. In other implementations the controller 100 is a separate, but cooperating, module. If a separate module, access to map software application 140 typically occurs through a software application program interface (API). Such cooperation may even occur over a network like the internet or home network. In the case of a map software application 140, like MapPoint for example, a user is preferable able to locate and illustrate points on maps (e.g., with so-called "pushpins" or other graphic or visual objects), with either the user's own data or other information. The map application 140 preferably allows information to be imported thereto.

The controller 100 provides the map application 140 with location information decoded from the images. The controller 100 can optionally provide a graphic or visual object to the map application 140 that is associated with the location information. For example, the controller 100 generates or obtains a thumbnail image that is associated with an image in the Trip directory and provides the thumbnail image to the map application 140. The map application 140 identifies or generates a map that is associated with the location information. The map is provided for display, along with an object representation associated with the provided information. If the controller 100 passed in objects (e.g., thumbnail images) to the map application 140, the objects can be displayed according to their relative position on the map. For example, with reference to FIG. 7, a map of the Western United States of America is displayed by map application 140. The map includes thumbnail images arranged geospatially relative to where the images were taken. (For example, photo 2 depicts a scene near La Grande, Oreg. USA. Thus, photo 2 is positioned near La Grande on the FIG. 7 map.).

Visual or graphical objects can be associated with related information via, e.g., watermark indexing, hyperlinks or object linking and embedding (OLE). The related information may include images or groups of images. Referring back to photo 2 (FIG. 7), clicking on the thumbnail photo may link a user to a higher resolution image of the photo 2, or to a group of images that are related (preferably by geolocation) to photo 2. Instead of linking to a related photograph, photo 2 may link to (or show) metadata, a website or audio/video clips. For example, the photograph may be associated with audio or video files that were taken at or near the geolocation. The photo 2 may also link to (or show) metadata (e.g., date/time, coordinates, camera, photographer, weather or lighting conditions, etc.), text (e.g., a Word file including a trip journal), a website photo gallery or to a collage or photo-mosaic of photos from the trip.

Figure 7:
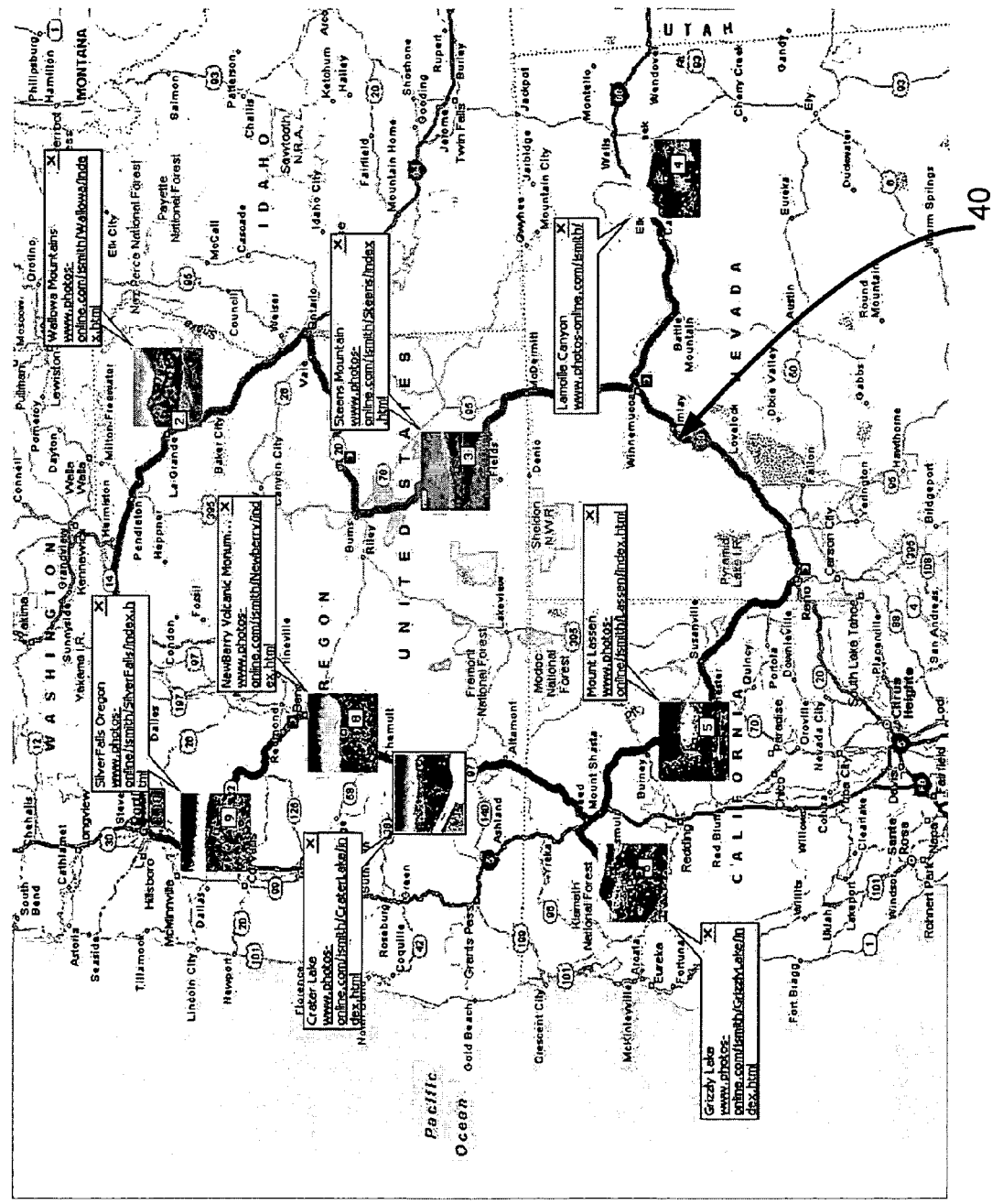
FIG. 7 illustrates a map generated by a map application, including visual or graphical objects displayed therewith.

FIG. 7 also shows a highlighted route 40 between objects (and associated geolocations) provided by controller 100 (FIG. 6). The route is preferably automatically generated once the geolocations are passed to the map application 140 by the controller 100. (For example, given the geolocations associated with photo 2 and photo 3, the map application 14 automatically generates and highlights a probably route between the two locations. The application optionally prompts (e.g., through a graphical user interface or pop-up window) the user to ensure that the generated route corresponds to the actual route traveled.).

Map application 140 preferably allows a user to zoom in and zoom out of a map area. An improvement is to provide or display a higher resolution image (relative to a thumbnail image) as the user zooms in. For example, if a user zooms in around the area associated with photo 2, a higher resolution image is displayed with the zoomed-in region. The higher resolution image is automatically retrieved via the object's associated link.

Figure 8C:
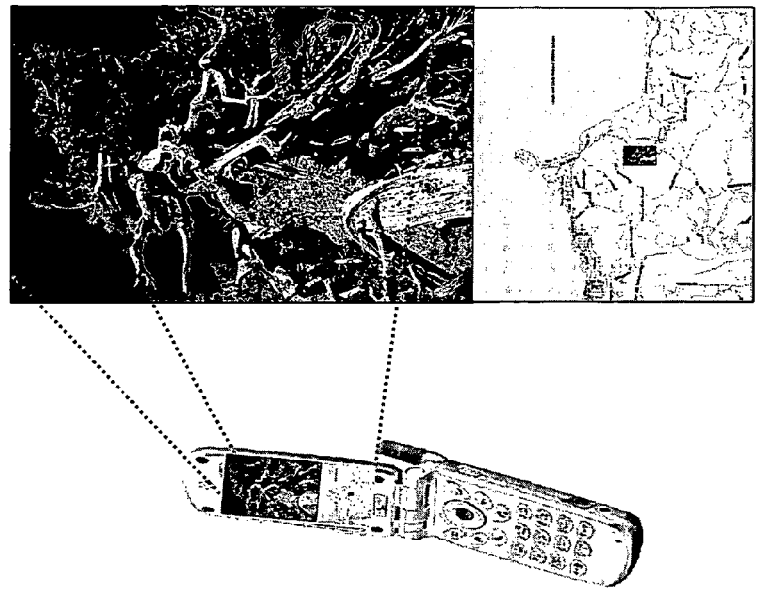
Figure 8A:
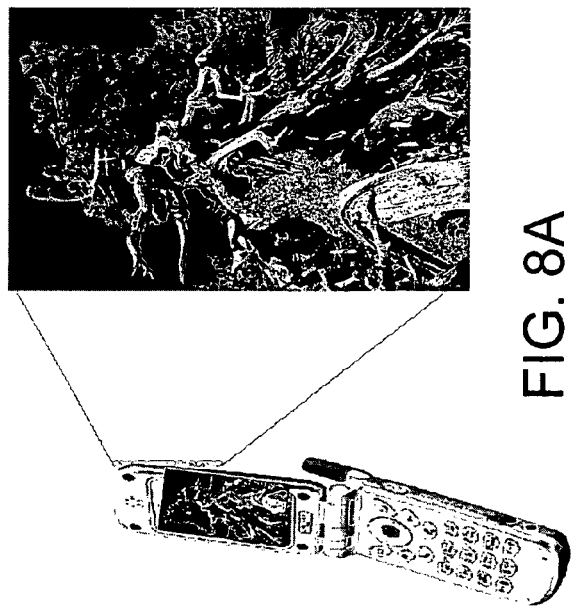
FIG. 8A illustrates image capture with a first mobile device.
Figure 8B:
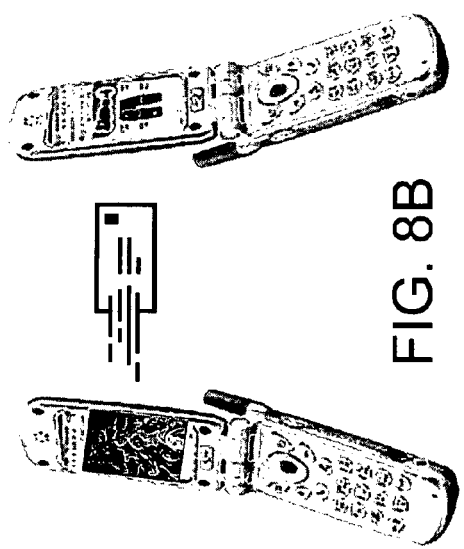
FIG. 8B illustrates communication of a captured image to a second mobile device.

Our inventive techniques are also applicable to mobile users. For example, with reference to FIGS. 8A-8C, a first user captures an image with a camera. The camera may cooperate with (e.g., via BlueTooth or tethered cable) or be incorporated in a cell phone (as shown in FIG. 8A). Location information, e.g., longitude and latitude, are steganographically embedded in a captured image. The embedded image is then email or otherwise communicated to a second user as shown in FIG. 8B. The second user opens the message and a steganographic decoder analyzes the image to obtain the embedded location information. The location information is provided to a map application (e.g., Pocket Streets or GeoSnapper.com). The first user's location (or a location associated with the transmitted image) is displayed on a map (FIG. 8C). Like the implementation discussed above with respect to FIG. 7, the image or a thumbnail representation of the image can be displayed at or by the user's first location.

The second user need not be a mobile user. For example, a first mobile user (e.g., a grandson) takes pictures while hiking in the Rocky Mountains. The pictures are steganographically embedded with their respective location information. The first user communicates the embedded pictures to a second user (e.g., a grandmother). The second user's home or laptop computer decodes the embedded location information and provides the location information to a map application, which displays the location of the images relative to a map. Thus, the second user remotely tracks the travels of the first user via steganographically embedded images.

We use voice commands in some related implementations. Voice commands are used to identify a location, which is embedded in a captured image. For example, a photographer takes a picture of a natural hot springs near McCall, Id. USA. The photographer talks into a microphone (e.g., the photographer says: "Hot springs near McCall, Id."). The captured speech is analyzed via speech recognition or audio analysis software. Recognized speech is used to identify a location associated with the hot springs. The location is preferably embedded in the image. Captured or recognized speech can also be used as metadata associated with the picture (e.g., a voice journal). The image can include a link to a storage location at which the audio (e.g., voice journal) stored.

Another implementation uses voice input as a watermark component. For example, a photographer audibly describes which of his children are depicted in a photograph (e.g., via a microphone in the camera; or, later, at home when the photographer reviews the pictures). Speech analyses or recognition software associates the speech with an identifier. For example, the word "Jane" is mapped or reduced to an identifier. The identifier is steganographically embedded in the corresponding image. The embedded image is stored in a directory or in an electronic album. Later, the embedded information (e.g., identifier representing "Jane") can be used to identify that Jane is depicted in the image. Embedded identifiers can be used to represent places, objects, people, trips, etc. in a similar manner. Image search engines (e.g., to search an electronic photo album or the internet) decode steganographically embedded identifiers in search of relevant search criteria.

Some possible combinations of the above techniques are described below:

A1. A method of identifying locations on a map, wherein the map is to be displayed via a computer display, said method comprising:
    receiving data representing a first image;
    analyzing the data to obtain information steganographically encoded therein, wherein the information comprises or links to first location information associated with the first image;
    providing a map including an area associated with the first location information, wherein the map is to be displayed via a computer display; and
    visually or graphically identifying a first location on the map that is associated with the first location information.

A2. The combination of A1, wherein the information is steganographically encoded in the form of a digital watermark.

A3. The combination of A1, wherein the computer display comprises a cell phone display screen.

A4. The combination of A1, wherein said identifying a first location comprises providing a visual or graphical object on or with the map at the first location.

A5. The combination of A4, wherein the object comprises a representation of the first image.

A6. The combination of A4, wherein the object comprises a thumbnail representation of the first image.

A7. The combination of A4, wherein the object is associated with a link.

A8. The combination of A7, wherein the link links to a copy of the first image.

A9. The combination of A7, wherein the link links to a plurality of images that are associated with the first location information.

A10. The combination of A7, wherein the link links to metadata associated with the first image.

A11. The combination of A10, wherein the metadata comprises at least one of audio, video, text, and document files.

A12. The combination of A1, further comprising:
    receiving data representing a second image;
    analyzing the data to obtain information steganographically encoded therein, wherein the information comprises or links to second location information associated with the second image; and
    visually or graphically identifying a second location on the map that is associated with the second location information A13. The combination of A12, further comprising generating a route between the first location and the second location.

A14. The combination of A13, wherein the route is highlighted on the map.

A15. A computer readable medium have computer executable instructions stored thereon, the instructions comprising instructions to cause a processor to carry out the method of any one of A1-A14.

B1. A method of representing a location comprising:
    receiving an image captured from a first wireless device, wherein the image comprises location information steganographic embedded therein;
    decoding the steganographic embedding to obtain the location information;

by using the location information or information identified by the location information, identifying a map representing a location associated with the location information; and displaying the map.

B2. The combination of B1, further comprising displaying a visual or graphical object on or with the map to identify the location.

B3. The combination of B1, wherein the object comprises a representation of the image.

B4. The combination of B1, wherein the method is carried out at least in part on a second wireless device.

B5. The combination of any one of B1-B5, wherein the first wireless device comprises at least one of a cell phone and a wireless, portable computing device.

B6. The combination of B4, wherein the second wireless device comprises at least one of a cell phone and wireless, portable computing device.

B7. A computer readable medium have computer executable instructions stored thereon, the instructions comprising instructions to cause a processor to carry out the method of any one of B1-B6.

C1. A computer comprising:
a display;
a processor;
a communications bus; and
memory in communication with said processor via said communications bus, wherein said memory comprises instructions stored therein for execution by said processor, said instructions comprising instructions to:
decode a digital watermark embedded in an image, the digital watermark including location information;
provide the location information to a map software module, wherein said map software module, upon receipt of the location information, provides a map depicting at least one area associated with the location information, and provides a visual or graphical object on the map to identify the area.

C2. The computer of C1, wherein the instructions further include instructions to: provide a reduced-bit representation of the image for use by the map software module, wherein the object comprises the reduced-bit representation of the image.

D1. A method of managing images, wherein each of the images comprise plural-bit data steganographically embedded therein in the form of a digital watermark, and wherein the plural-bit data corresponds to a geo-location, said method comprising:
receiving a first query regarding a first geo-location;
identifying images corresponding to the first geo-location;
providing at least a listing of the images corresponding to the first geo-location; and
in response to the listing receiving a second query narrowing the listing.

D2. The combination of D1, wherein the second query comprises a date range.

D3. The combination of D1, wherein the second query comprises a season.

D4. The combination of D1, wherein the second query comprises a directional angle.

E1. A method of managing images, wherein at least some of the images comprise plural-bit data steganographically embedded therein in the form of a digital watermark, and wherein the plural-bit data corresponds to a geo-location, said method comprising:
receiving a first query corresponding to a first geo-location and a first image capture angle;
identifying images corresponding to the first geo-location and first image capture angle;
providing at least a listing of the images corresponding to the first geo-location and first image capture angle.

F1. A method of sharing images in a file sharing network, wherein each of the images comprise plural-bit data steganographically embedded therein in the form of a digital watermark, and wherein the plural-bit data corresponds to a geo-location, said method comprising:
maintaining a catalog on a computer server comprising a listing of images indexed according to geo-location, the catalog comprising an internet address associated with the images; and
providing a sub-set of the catalog in response to a geo-location based inquiry.

G1. A method comprising:
receiving an image including a digital watermark embedded therein, wherein the digital watermark comprises location information;
decoding the digital watermark to obtain the location information;
identifying a map depicting a location corresponding to the location information; and
providing the map for access over a computer network.

G2. The combination of G1, further comprising identifying a location on the map that is particularly associated with the location.

H1. A method of providing searchable images comprising:
receiving audio associated with an image;
reducing the audio to an identifier; and
embedding the identifier in the image as a steganographic component or storing the identifier in a header associated with the image.

H2. A combination of H1, wherein further comprising adding the identifier to a table or data record, wherein the table or data record maps the audio to the identifier.

H3. A combination of H2, wherein the table or data record is mapped to the audio through text representing the audio.

H4. A combination of H2, wherein the table or data record is mapped to the audio through a pattern match of the audio.

CONCLUSION

The foregoing are just exemplary implementations of the present invention. It will be recognized that there are a great number of variations on these basic themes. The foregoing illustrates but a few applications of the detailed technology. There are many others.

To provide a comprehensive disclosure without unduly lengthening this specification, applicants incorporate by reference, in their entireties, the disclosures of the above-cited patent documents and two publications. The particular combinations of elements and features in the above-detailed embodiments are exemplary only; the interchanging and substitution of these teachings with other teachings in this application and the incorporated-by-reference patents/applications are also contemplated.

There are many embodiments discussed herein which may benefit from the inclusion of two different watermarks. For example, a first watermark may include information evidencing (or pointing to) georeferencing information, while a second watermark includes a database identifier or location. The second watermark may alternatively include (or point toward) information pertaining to events, people or animals identified in the photograph, occasions, groups, institutions, copyright ownership, etc. Or an image may include both a robust watermark and a copy-tamper fragile watermark.

We intend this application to be interpreted broadly. For example, the term "map" is intended to apply to a wide variety of maps including, but not limited to, street maps, terrain maps, demographics maps, photographic maps (e.g., think satellite images or Keyhole, Inc.), topographical maps, physical maps, geological maps, historical maps, nautical charts, 3D-representations, political maps, road maps, Geographical Information System (GIS) layers, etc., etc.

The methods, processes, and systems described above may be implemented in hardware, software or a combination of hardware and software. For example, the location information encoding processes may be implemented in a programmable computer or a special purpose digital circuit. Similarly, location information decoding may be implemented in software, firmware, hardware, or combinations of software, firmware and hardware. The methods and processes described above may be implemented in programs executed from a system's memory (a computer readable medium, such as an electronic, optical or magnetic storage device).

As mentioned above, while our discussion has focused on CMOS sensors, it will be appreciated that our techniques will apply to other on-chip environments (e.g., CCD) as well. Also, while we have used RGB and CMY color spaces as examples, the present invention is not limited there to. Of course, our technique will apply to a myriad of other possible color models that a sensor could produce to minimize color gamut compression for a fixed pixel size (e.g., a fixed number of bits.)

In view of the wide variety of embodiments to which the principles and features discussed above can be applied, it should be apparent that the detailed embodiments are illustrative only and should not be taken as limiting the scope of the invention.

We claim:

1. A CMOS imager comprising: a plurality of pixels arranged in columns and rows, wherein each of the pixels includes: a photodetector; a color filter portion; and a microlens; and a communications bus to selectively read out image data from the plurality of pixels, wherein the plurality of pixels includes at least a first set of pixels, with the first set of pixels having physical properties so as to introduce a hidden or concealed digital watermark component to image data during image capture by the CMOS imager, wherein each of the plurality of pixels communicates with different amplifiers, and wherein the physical properties comprise varied gain of different amplifiers associated with the first set of pixels.

* * * * *

UNITED STATES PATENT AND TRADEMARK OFFICE
CERTIFICATE OF CORRECTION

| | | |
|---|---|---|
| PATENT NO. | : 8,457,346 B2 | |
| APPLICATION NO. | : 11/051502 | |
| DATED | : June 4, 2013 | |
| INVENTOR(S) | : Rodriguez et al. | |

It is certified that error appears in the above-identified patent and that said Letters Patent is hereby corrected as shown below:

In the Specification

In Column 1, Line 21, delete "stenography." and insert -- steganography. --, therefor.

Signed and Sealed this
Eighteenth Day of March, 2014

Michelle K. Lee
*Deputy Director of the United States Patent and Trademark Office*